US006561530B2

(12) United States Patent
Carbonero

(10) Patent No.: US 6,561,530 B2
(45) Date of Patent: May 13, 2003

(54) GYM SCOOTER

(75) Inventor: Kurt K. Carbonero, Rochester, MI (US)

(73) Assignee: Pull-Buoy, Inc., Sterling Heights, MI (US)

( * ) Notice: Subject to any disclaimer, the term of this patent is extended or adjusted under 35 U.S.C. 154(b) by 0 days.

(21) Appl. No.: 09/844,464

(22) Filed: Apr. 27, 2001

(65) Prior Publication Data

US 2002/0158437 A1 Oct. 31, 2002

(51) Int. Cl.[7] .............................. B62M 1/00; F16B 2/22
(52) U.S. Cl. ........................ 280/87.041; 280/87.021; 280/79.11; 403/364
(58) Field of Search ................. 280/87.041, 87.042, 280/87.01, 32.6, 87.021, 79.11, 87.05; 403/364, 384, 12, 13; 297/248, 249; 220/23.2, 23.4

(56) References Cited

U.S. PATENT DOCUMENTS

| | | | |
|---|---|---|---|
| 2,711,906 A | | 6/1955 | Rideout, et al. |
| 2,766,993 A | | 10/1956 | Reichelt |
| 3,197,227 A | | 7/1965 | Anselmo |
| 3,314,718 A | * | 4/1967 | Crandall ................. 297/248 |
| 3,567,242 A | * | 3/1971 | Miller ................. 280/87.041 |
| 3,669,494 A | * | 6/1972 | Lohmeyer ............... 297/248 |
| 3,758,155 A | * | 9/1973 | Straits ..................... 297/248 |
| D236,743 S | * | 9/1975 | Moustakas ............ 280/87.041 |
| 4,003,491 A | * | 1/1977 | Wells et al. .............. 220/23.4 |
| 4,721,316 A | | 1/1988 | Whiteside |
| D296,048 S | | 6/1988 | Eie |
| 4,955,626 A | * | 9/1990 | Smith et al. ........... 280/87.042 |
| 5,052,703 A | * | 10/1991 | Bertrand ................. 280/47.34 |
| 5,074,572 A | | 12/1991 | Delmerico et al. |
| 5,110,147 A | * | 5/1992 | Gershman ................. 280/79.5 |
| 5,181,297 A | * | 1/1993 | Andrews, Jr. et al. ..... 220/23.4 |
| 5,282,669 A | * | 2/1994 | Barile ..................... 297/248 |
| 5,445,396 A | | 8/1995 | Sebor |
| 5,458,351 A | * | 10/1995 | Yu ....................... 280/87.042 |
| 5,494,305 A | | 2/1996 | Chen |
| 5,505,474 A | * | 4/1996 | Yeh ...................... 280/87.042 |
| 5,524,322 A | | 6/1996 | Muehlen |
| 5,531,465 A | | 7/1996 | Aumasson, et al. |
| D378,154 S | | 2/1997 | Presnell |
| 5,704,625 A | * | 1/1998 | Presnell et al. ............ 220/79.2 |
| 5,711,540 A | | 1/1998 | Nesting |
| 5,823,549 A | | 10/1998 | Morgan |
| D414,305 S | | 9/1999 | Rohn et al. |
| D428,367 S | | 7/2000 | Lundh |

OTHER PUBLICATIONS

1. Portion of Gym Closet Catalog, GYM CLOSET, 2000, pages 101 and 102, Sterling Heights, Michigan.

* cited by examiner

Primary Examiner—Brian L. Johnson
Assistant Examiner—Jeffrey Restifo
(74) Attorney, Agent, or Firm—Reising, Ethington, Barnes, Kisselle, Learman & McCulloch, P.C.

(57) ABSTRACT

A scooter includes a platform and at least three casters. The platform has a horizontal top surface and at least one vertical side surface extending downwardly from the top surface. The casters extend downwardly to support the platform when the platform rolls. The scooter also includes a horizontal flange and a vertical flange. The horizontal flange extends away from the vertical side surface. The vertical flange extends the horizontal flange. The vertical side surface, the horizontal flange and the vertical flange define a groove adapted to receive a mating tongue on a second scooter. This provides an integral, low-profile tongue-and-groove type of connection between two or more scooters.

12 Claims, 5 Drawing Sheets

GYM SCOOTER

TECHNICAL FIELD

The invention relates generally to a scooter, and more particularly to a scooter used for recreational purposes.

BACKGROUND

People skilled with gym equipment and sporting goods are familiar with using a scooter for recreational and physical education purposes. Propelling the scooter across a floor helps to build upper and lower body strength, and improve coordination. Sometimes people desire to use two or more scooters. For example, a single person may wish to move across the floor in a prone or supine position; or several people may wish to move together. But in either of these cases, movement can be clumsy or awkward—absent some firm connection between scooters—because the scooters may not move in the same direction.

The prior art addresses this problem by using an elongated connecting rod to connect two or more scooters together. But a problem arises if the connecting rod is not immediately available or otherwise lost—because the connecting rod is a separate item. Also, because the rod is elongated and narrow, it connects the scooters in a spaced-apart manner; and this is impractical and uncomfortable for the single user who wishes to lie flat across two or more scooters. Finally, because the connector is elongated and narrow, it may get broken if someone falls or steps on it.

SUMMARY OF THE INVENTION AND ADVANTAGES

The present scooter includes a platform and at least three casters extending downwardly from the platform to support the platform in rolling movement. The scooter further includes a horizontal flange extending away from the platform; and a vertical flange extending from the horizontal flange. In this way, the platform, the horizontal flange, and the vertical flange define a space that is adapted to receive a mating tongue on a second scooter whereby the scooter may connect with the second scooter.

This new arrangement provides for a low profile, integral connection. The low profile of the connection does not interfere with normal use and operation of the scooter, and is not likely to get broken. It is also integral with the scooter and will not get lost. Therefore, if one wants to connect two or more scooters, one does not need an additional connecting component. This new arrangement also provides a flush connection between two scooters. The flush connection is more elegant and simple, and this will afford comfort to one or more riders using multiple scooters attached together.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
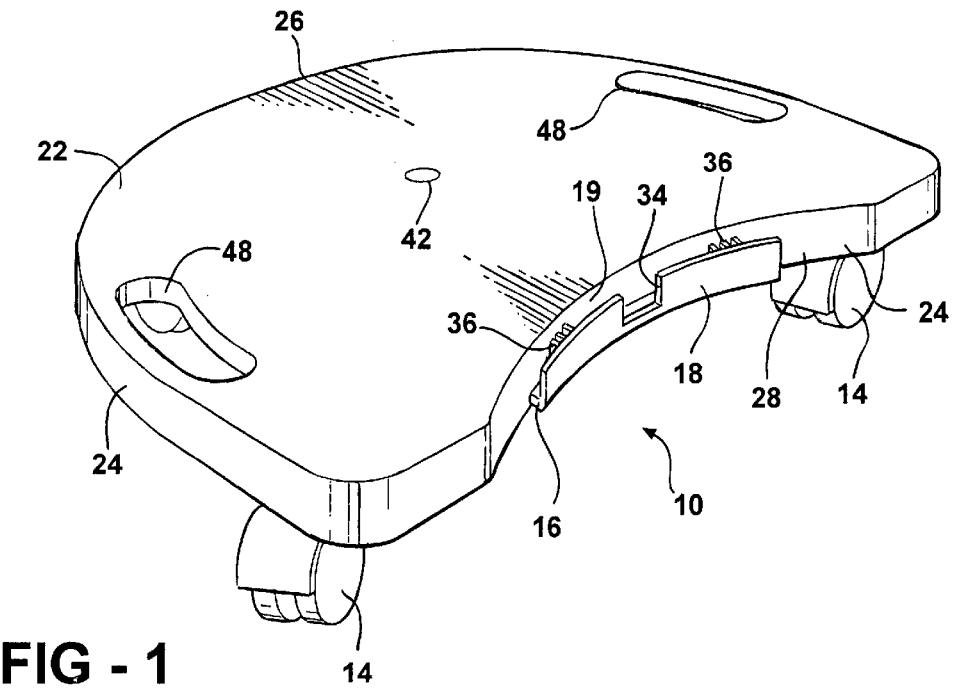
FIG. 1 is a top perspective view of the scooter.

The present invention will now be described, by way of example, with reference to the accompanying drawings in which the scooter is generally shown at 10.

According to the most basic conception of the invention, the scooter 10 includes a platform 12 and at least three casters 14 extending downwardly from the platform to support it in rolling movement. The scooter 10 further includes a horizontal flange 16 extending away from the platform 12; and a vertical flange 18 extending from the horizontal flange 16. In this way, the platform 12, the horizontal flange 16, and the vertical flange 18 define a space or groove 19 that is adapted to receive a mating tongue 20 on a second scooter whereby the scooter 10 may connect with the second scooter. The platform 12 may include a horizontal top surface 22 and at least one vertical side surface 24 extending down from the top surface; and the horizontal flange 16 may extend from this side surface 24.

According to one preferred embodiment, the platform 12 has a projecting front-end 26 spaced away from a recessed back-end 28. The projecting front-end 26 is preferably convex, with the recessed back-end 28 being concave. This configuration is shown clearly in FIGS. 1–4 and 7. The projecting front-end may also be triangular, with the recessed back-end being V-shaped. Other projecting/recessed shapes of the platform are also possible.

Figure 5:
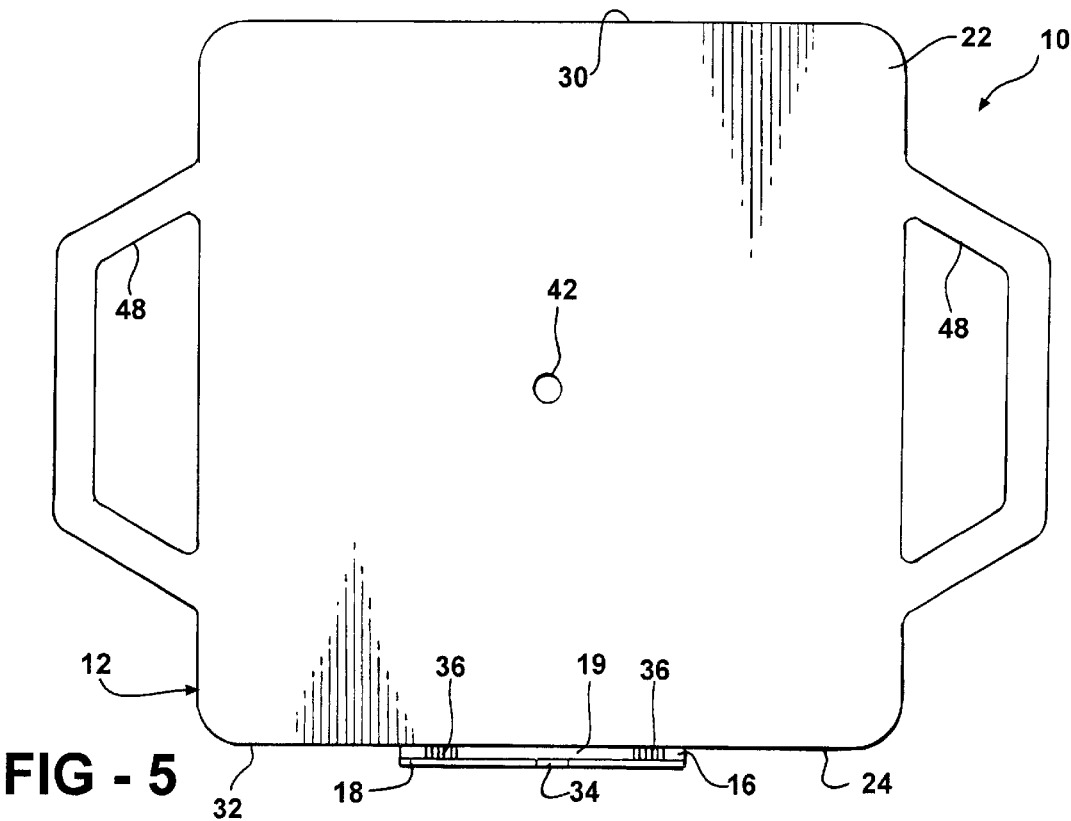
FIG. 5 is a top view of an alternative embodiment.
Figure 6:
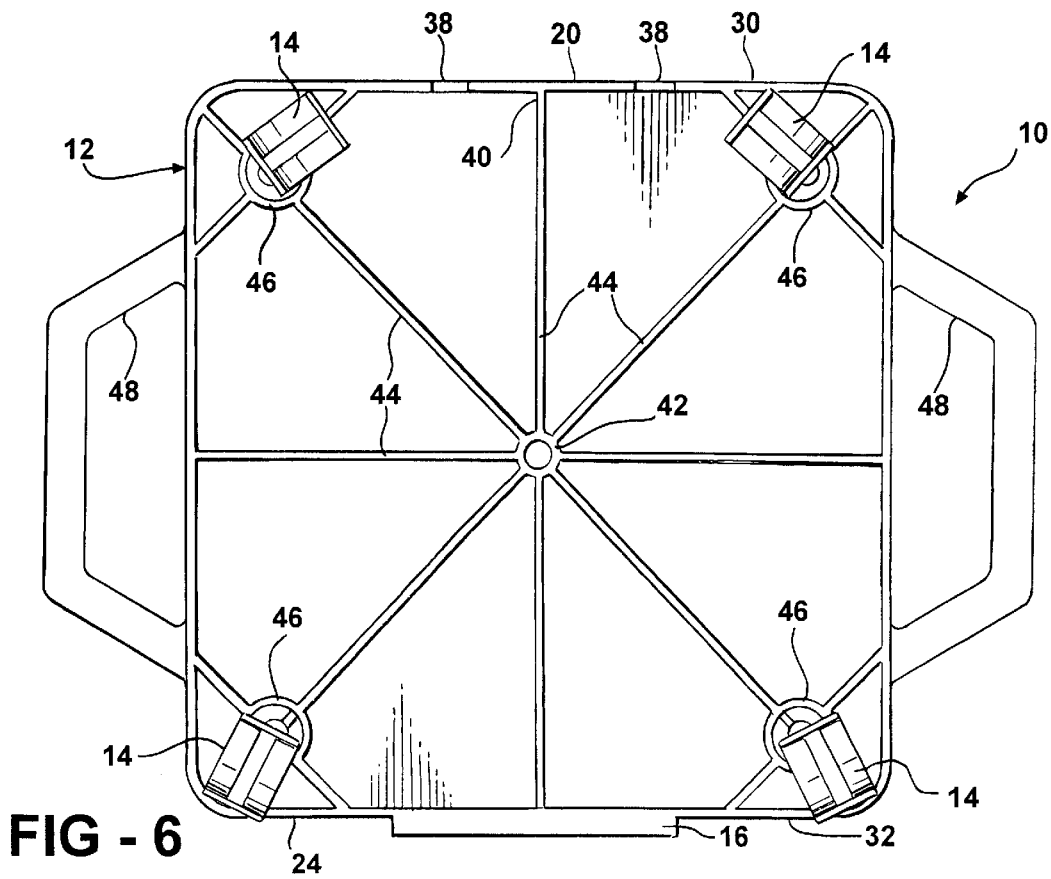
FIG. 6 is a bottom view of the alternative embodiment
Figure 8:
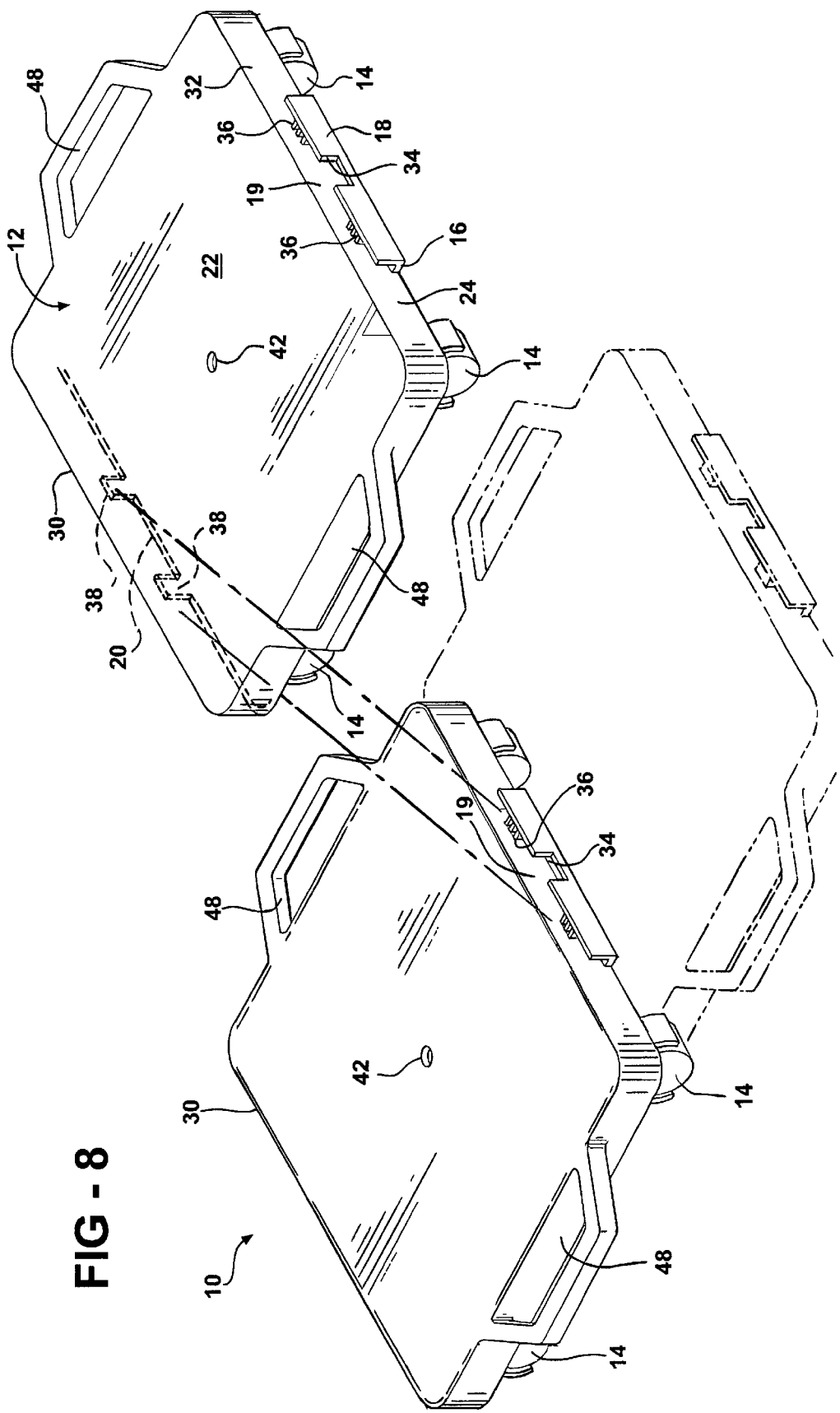
FIG. 8 is a top perspective view of two alternative embodiment scooters exploded away from each other to show the manner in which they connect.

Still within the scope of the present invention, the platform may have the front-end that does not project, and the back-end that does not recess, such that the front-end and the back-end are parallel to one another. For example, a generally square configuration is shown in FIGS. 5, 6, and 8, with a flat front end 30 and a flat rear end 32. The general shape of the scooter 10 is not critical.

According to a preferred embodiment shown in FIGS. 1–4 and 7, the scooter 10 has the tongue 20 located at the projecting front-end 26, and the groove 19 located at the recessed back-end 28. The horizontal flange 16 extends away from the recessed back-end 28. Extending up from the horizontal flange 16 is the vertical flange 18 such that the recessed back-end 28, the horizontal flange 16, and the vertical flange 18 define the groove 19. Disposed at the mid-point of the vertical flange 18 is a notch 34. Two sets of groove reinforcing ribs 36 are disposed in the groove 19—one set on each side of the notch 34. These ribs 36 support the vertical flange 18 against loads that result from connecting two scooters.

Located at the projecting front-end 26 is the tongue 20, which extends downwardly from the platform 12. As shown in the Figures, the tongue 20 is spaced away from the vertical side surface 24 that extends most of the way around the scooter 10. The tongue 20 is spaced away from the side surface 24 on either side with a notch 38 as shown in the Figures. A number of tongue-reinforcing ribs 40 are disposed between the platform 12 and the midpoint of the tongue 20. These reinforcing ribs 40 support the tongue 20 against loads that will pull on the tongue 20 when two scooters are connected with the tongue 20 disposed in the groove 19. The tongue 20 is dimensioned so that it fits snugly within the groove 19 as shown in the Figures. Similarly, the notch 34 on the vertical flange 18 is dimensioned so that the tongue reinforcing ribs 40 fit snugly inside it. Also, the notches 38 on either side of the tongue 20 are sized so that the groove reinforcing ribs 36 fit snugly within the notches 38.

Located at the center of the platform 12 is an opening 42 to allow for the insertion of a stacking pole (not shown). Stacking poles are used to conveniently place a plurality of scooters 10 on top of one another for ease in storage. While the scooters 10 are stacked, the stacking pole 42 also prevents horizontal movement.

Beneath the platform 12 and radiating outwardly from the opening 42 are a number of reinforcing beams 44 that extend to the vertical side surface 24 and the tongue 20. These beams 44 provide stiffness and rigidity to the platform 12. Preferably, the beams 44 are molded onto the bottom of the platform 12.

Figure 2:
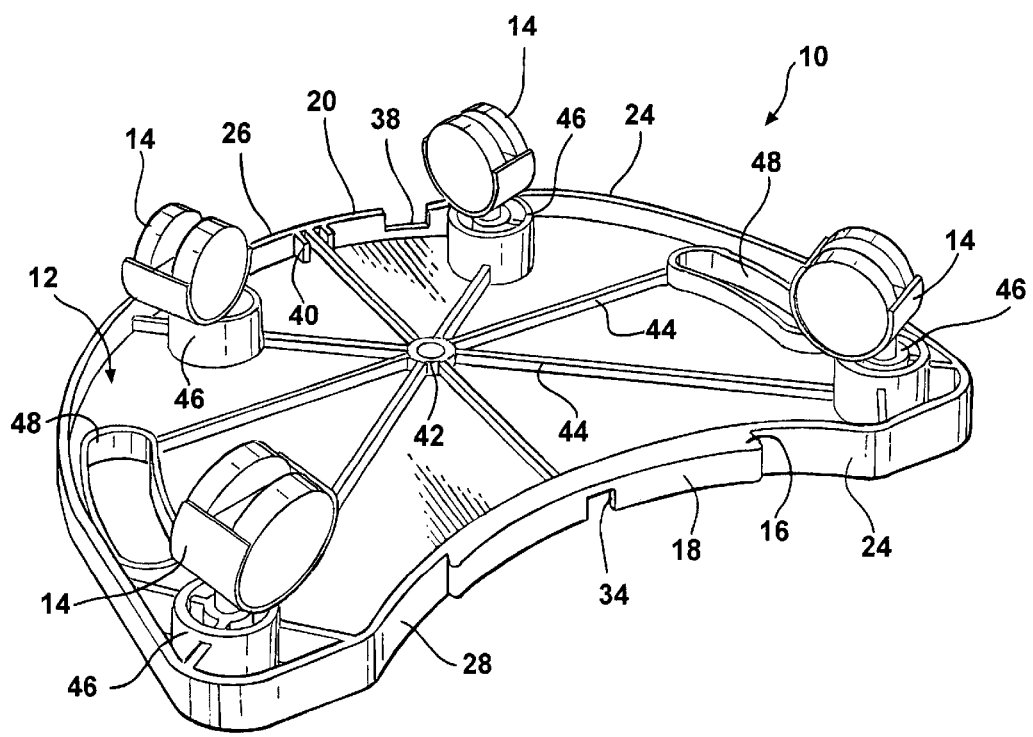
FIG. 2 is a bottom perspective view of the scooter.
Figure 3:
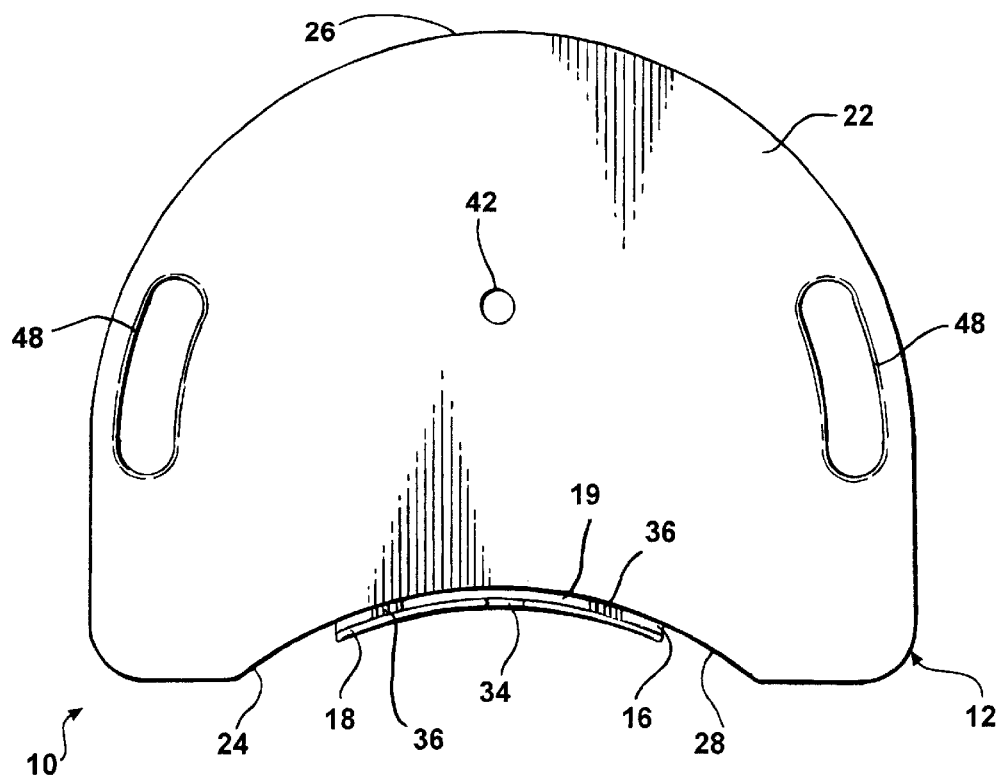
FIG. 3 is a top view of the scooter.
Figure 4:
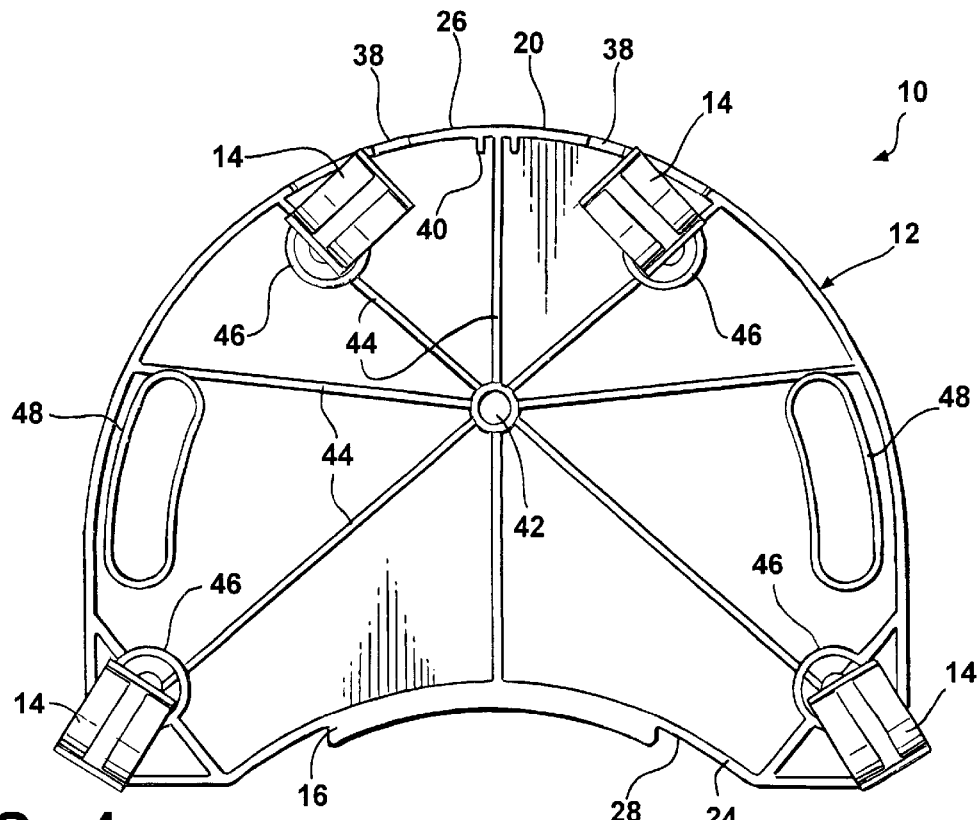
FIG. 4 is a bottom view of the scooter.

The scooter 10 has four casters 14 extending downwardly from the platform 12 that allow the scooter 10 to move as directed by the rider. The casters 14 are conventional casters. They snap fit into cylindrical receptacles 46 molded into the bottom of the platform 12 as shown in FIGS. 2, 4, and 6.

The scooter 10 has at least one handle aperture 48 through the platform 12. To stabilize the rider's position on top of the scooter 10, the rider anchors himself or herself by grasping the handle aperture 48. The handle aperture 48 can also be grasped to aid in carrying the scooter 10 while it is not used. Configurations for handles 48 are shown in the Figures. Preferably, there are two handles 48.

The platform 12 is desirably formed with injection molding techniques from a heavy-duty plastic. One suitable material is polyethylene.

In operation, a person may connect two scooters 10 together with the tongue 20 of a back scooter mating within the groove 19 of a front scooter to create a horizontal nesting arrangement. As mentioned, the tongue 20 fits snugly within the groove 19; and the various notches 34, 38 provide clearance for the various reinforcing ribs 36, 40. The tongue-and-groove style of mating prevents horizontal separation of the two connected scooters 10. In other words, one scooter 10 must be lifted in order to cause a separation.

The arrangement described above also prevents sliding movement between the tongue 20 and groove 19. The tongue 20 of the back scooter fits snugly between the reinforcing ribs 36 located in the groove 19 of the front scooter. Simultaneously, the reinforcing ribs 40 located between the tongue 20 and the platform 12 of the back scooter fit snugly in the notch 34 of the vertical flange 18 of the front scooter.

Figure 7:
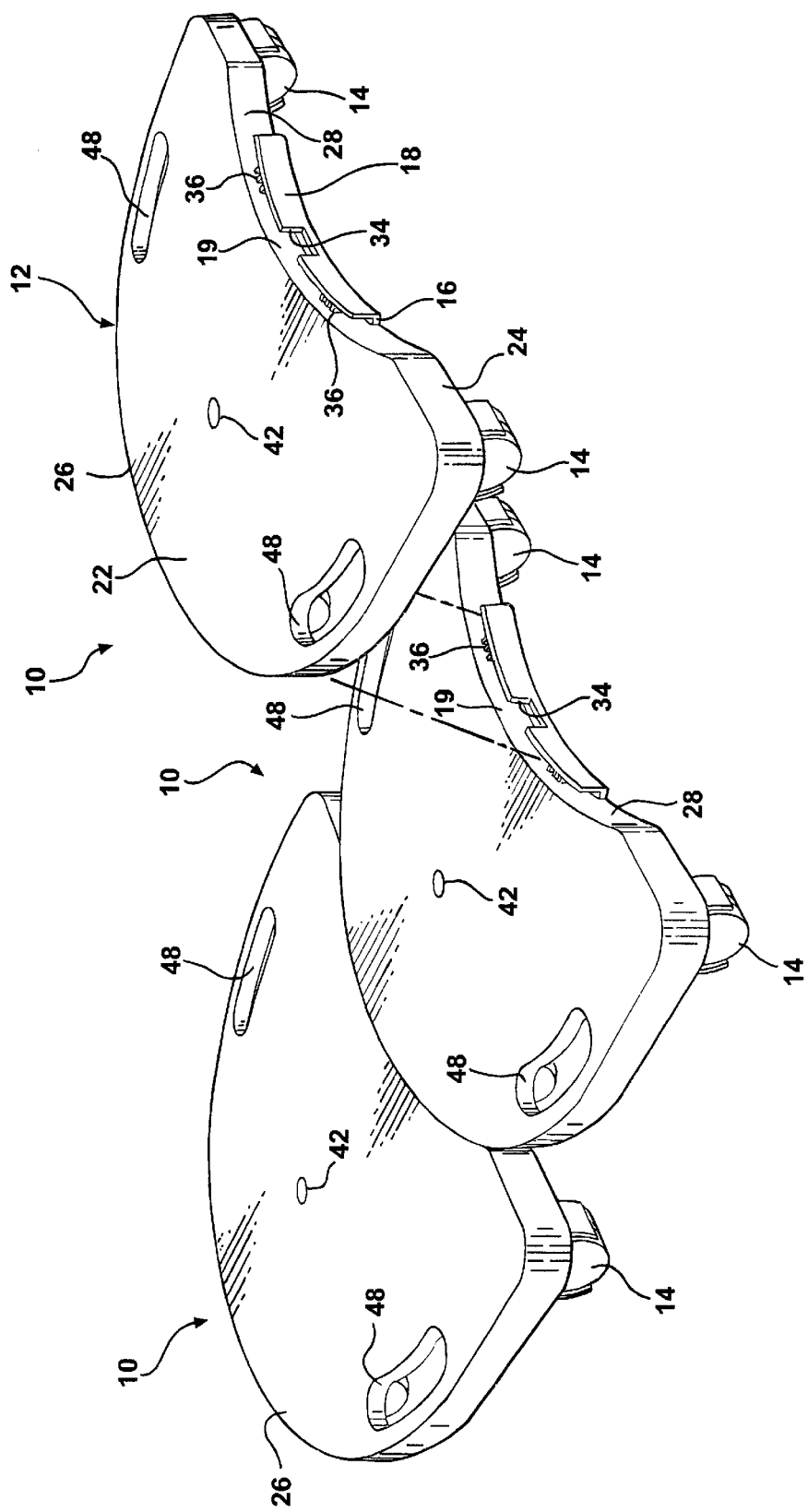
FIG. 7 is a top perspective view of three scooters, with two scooters connected together and one exploded away.

FIGS. 7 and 8 show two or more scooters 10 connected together in the flush manner that the invention allows. Accordingly, a person may readily construct a chain of scooters 10 to permit multiple riders, or to permit a single rider to ride in a supine, prone, or sitting position.

Although the preferred embodiment of the present invention has been disclosed, various changes and modifications may be made without departing from the scope of the invention as set forth in the appended claims.

We claim:

1. A scooter comprising:
   (a) a platform having a horizontal top surface and at least one vertical side surface extending downwardly from the top surface;
   (b) at least three casters extending downwardly from the platform to support the platform in rolling movement; and
   (c) the scooter further comprising:
      (i) a horizontal flange extending away from the vertical side surface; and
      (ii) a vertical flange extending from the horizontal flange wherein the vertical side surface, the horizontal flange and the vertical flange define a groove adapted to receive a mating tongue on a second scooter, the scooter further including a plurality of groove reinforcing ribs disposed in the groove and extending between the vertical side surface and the vertical flange.

2. The scooter of claim 1 further including a tongue extending from the platform at a position spaced away from the horizontal flange.

3. The scooter of claim 2 including a plurality of tongue reinforcing ribs disposed between the platform and the tongue.

4. The scooter of claim 3 wherein the vertical flange defines a notch to provide clearance for the tongue reinforcing ribs, with the groove reinforcing ribs being disposed on either side of the notch.

5. The scooter of claim 1 including a projecting front-end spaced away from a recessed back-end.

6. The scooter of claim 5 wherein the tongue is disposed on the projecting front-end, and the groove is disposed on the recessed back-end.

7. The scooter of claim 5 wherein the projecting front-end is convex and the recessed back-end is concave.

8. The scooter of claim 1 wherein the platform defines at least one handle aperture through the top surface.

9. The scooter of claim 1 wherein the platform is formed by injection molding.

10. The scooter of claim 1 wherein four casters extend downwardly from the platform to support the platform in rolling movement.

11. The scooter of claim 1 wherein the platform defines a centrally located hole to guide the platform on a stacking pole.

12. The scooter of claim 11 including a plurality of reinforcing beams beneath the platform that radially extend outwardly from the hole.

* * * * *